(12) United States Patent
Iizuka et al.

(10) Patent No.: US 12,100,570 B2
(45) Date of Patent: Sep. 24, 2024

(54) POWER SUPPLY DEVICE, MICROWAVE TUBE DEVICE, POWER SUPPLY METHOD, AND RECORDING MEDIUM

(71) Applicant: NEC Network and Sensor Systems, Ltd., Fuchu (JP)

(72) Inventors: Naoki Iizuka, Tokyo (JP); Yukihira Nakazato, Tokyo (JP)

(73) Assignee: NEC Network and Sensor Systems, Ltd., Tokyo (JP)

( * ) Notice: Subject to any disclaimer, the term of this patent is extended or adjusted under 35 U.S.C. 154(b) by 82 days.

(21) Appl. No.: 17/927,214

(22) PCT Filed: Feb. 15, 2021

(86) PCT No.: PCT/JP2021/005522
§ 371 (c)(1),
(2) Date: Nov. 22, 2022

(87) PCT Pub. No.: WO2021/240909
PCT Pub. Date: Dec. 2, 2021

(65) Prior Publication Data
US 2023/0207246 A1   Jun. 29, 2023

(30) Foreign Application Priority Data

May 28, 2020 (JP) ................................ 2020-093062

(51) Int. Cl.
*H01J 23/34* (2006.01)
*H01J 25/34* (2006.01)
*H02M 3/335* (2006.01)

(52) U.S. Cl.
CPC .............. *H01J 23/34* (2013.01); *H01J 25/34* (2013.01); *H02M 3/335* (2013.01)

(58) Field of Classification Search
CPC .......... H01J 23/34; H01J 25/34; H02M 3/335; G06F 1/26
See application file for complete search history.

(56) References Cited

U.S. PATENT DOCUMENTS

| | | | |
|---|---|---|---|
| 2003/0184232 A1* | 10/2003 | Kobayashi | H01J 23/34 |
| | | | 315/5 |
| 2005/0077831 A1* | 4/2005 | Tsuchida | H01J 25/34 |
| | | | 315/3.5 |
| 2008/0231197 A1 | 9/2008 | Chiba et al. | |

FOREIGN PATENT DOCUMENTS

| | | |
|---|---|---|
| CN | 202997689 U | 6/2013 |
| JP | H08-111183 A | 4/1996 |

(Continued)

OTHER PUBLICATIONS

International Search Report for PCT Application No. PCT/JP2021/005522, mailed on Apr. 20, 2021.

(Continued)

*Primary Examiner* — Abdullah A Riyami
*Assistant Examiner* — Syed M Kaiser
(74) *Attorney, Agent, or Firm* — Sughrue Mion, PLLC

(57) ABSTRACT

In order to suppress the amount of time needed for the start-up of a microwave tube carried out when voltage fed from a power source has decreased, while avoiding increase in scale of a power storage unit, this power supply device includes: a power supply unit that supplies power fed from the power source to the microwave tube that is provided with a cathode, a heater for heating the cathode, an anode, and a collector; a power storage unit that stores the fed power and, if the voltage of the fed power decreases, supplies stored power that is power obtained by the power storing, to the microwave tube; and a power supply switching unit that, if (Continued)

the voltage of the fed power decreases, stops supplying the stored power to the anode and does not stop supplying the stored power to the heater.

11 Claims, 3 Drawing Sheets

(56) References Cited

FOREIGN PATENT DOCUMENTS

| | | | |
|---|---|---|---|
| JP | 2000294156 A | * | 10/2000 |
| JP | 2008-234907 A | | 10/2008 |
| WO | 2018/151253 A1 | | 8/2018 |

OTHER PUBLICATIONS

Canadian Office Action for CA Application No. 3,184,915, mailed on Apr. 30, 2024.
Extended European Search Report for EP Application No. 21814258.6, dated on May 15, 2024.

* cited by examiner

POWER SUPPLY DEVICE, MICROWAVE TUBE DEVICE, POWER SUPPLY METHOD, AND RECORDING MEDIUM

This application is a National Stage Entry of PCT/JP2021/005522 filed on Feb. 15, 2021, which claims priority from Japanese Patent Application 2020-093062 filed on May 28, 2020, the contents of all of which are incorporated herein by reference, in their entirety.

TECHNICAL FIELD

The present invention relates to a device for amplifying microwaves.

BACKGROUND ART

A microwave tube (also referred to as a "microwave electron tube" or a "traveling wave tube".) is a device that amplifies an input microwave. For example, Patent Literature 1 (PTL1) discloses a microwave amplification device including a helix-type traveling wave tube that is a type of microwave tube.

In the microwave amplification device, output abnormality occurs when power supply is stopped due to a decrease in power supply voltage, instantaneous interruption, or the like. Therefore, in the microwave amplification device, the supply power from the power source is stored by a mechanism (hereinafter, referred to as a "power storage unit".) for storing power (charge) of a capacitor, a secondary battery, or the like, and thus, even when the supply voltage decreases or stops (hereinafter, may be simply referred to as "decrease".), the supply voltage is prevented from being insufficient for a certain period.

CITATION LIST

Patent Literature

[PTL1] WO 2018/151253 A

SUMMARY OF INVENTION

Technical Problem

However, even in a case where the power storage unit described in the section of Background Art is provided, when the period in which the supply voltage from the power source decreases is long, the stored power (charge) is consumed, and thus, the supply voltage from the power storage unit decreases. When the voltage drop rapidly progresses, not only abnormality or stop occurs in the output of the microwave, but also a temperature of a heater (see PTL1) for heating a cathode included the microwave tube decreases due to a decrease in power supplied to the heater. Once the temperature of the heater decreases, it takes time to recover to a desired temperature because the heater has a certain heat capacity. Therefore, even when the supply voltage from the power source is recovered thereafter, it takes time to recover the heater temperature, and thus, it takes time until the cathode can normally emit electrons.

In order to alleviate this issue, it is effective to provide a power storage unit having a larger power storage amount, but for this purpose, a larger secondary battery and a larger capacitor are required.

An object of the present invention is to provide a power supply device and the like capable of suppressing a time required for start-up of a microwave tube performed when a supply voltage from a power source decreases without enlarging a scale of a power storage unit.

Solution to Problem

According to the present invention, there is provided a power supply device including: a power supply unit that feeds supply power from a power source to a microwave tube including a cathode, a heater for heating the cathode, an anode, and a collector; a power storage unit that stores the supply power and supplies stored power that is the stored power to the microwave tube when a voltage of the supply power decreases; and a power supply switching unit that stops the supply of the stored power to the anode and does not stop the supply of the stored power to the heater when the voltage of the supply power decreases.

Advantageous Effects of Invention

The power supply device and the like of the present invention can suppress a time required for start-up of the microwave tube, which is performed when the supply voltage from the power source decreases, without enlarging a scale of the power storage unit.

EXAMPLE EMBODIMENT

A microwave tube device of the present example embodiment monitors a voltage of a power storage unit, and stops the power supply to an anode when a decrease in the voltage is observed. As a result, since an electron flow from a cathode to a collector in a microwave tube is stopped, power consumption is greatly suppressed. Therefore, when supply voltage from a power source decreases, a period in which the voltage supplied from the power storage unit to a heater that heats the cathode is maintained around a set value is lengthened, and thus, the temperature decrease of the heater is suppressed. As a result, the power supply device of the present example embodiment shortens a time required for recovery when the supply voltage from the power source is insufficient.

Figure 1:
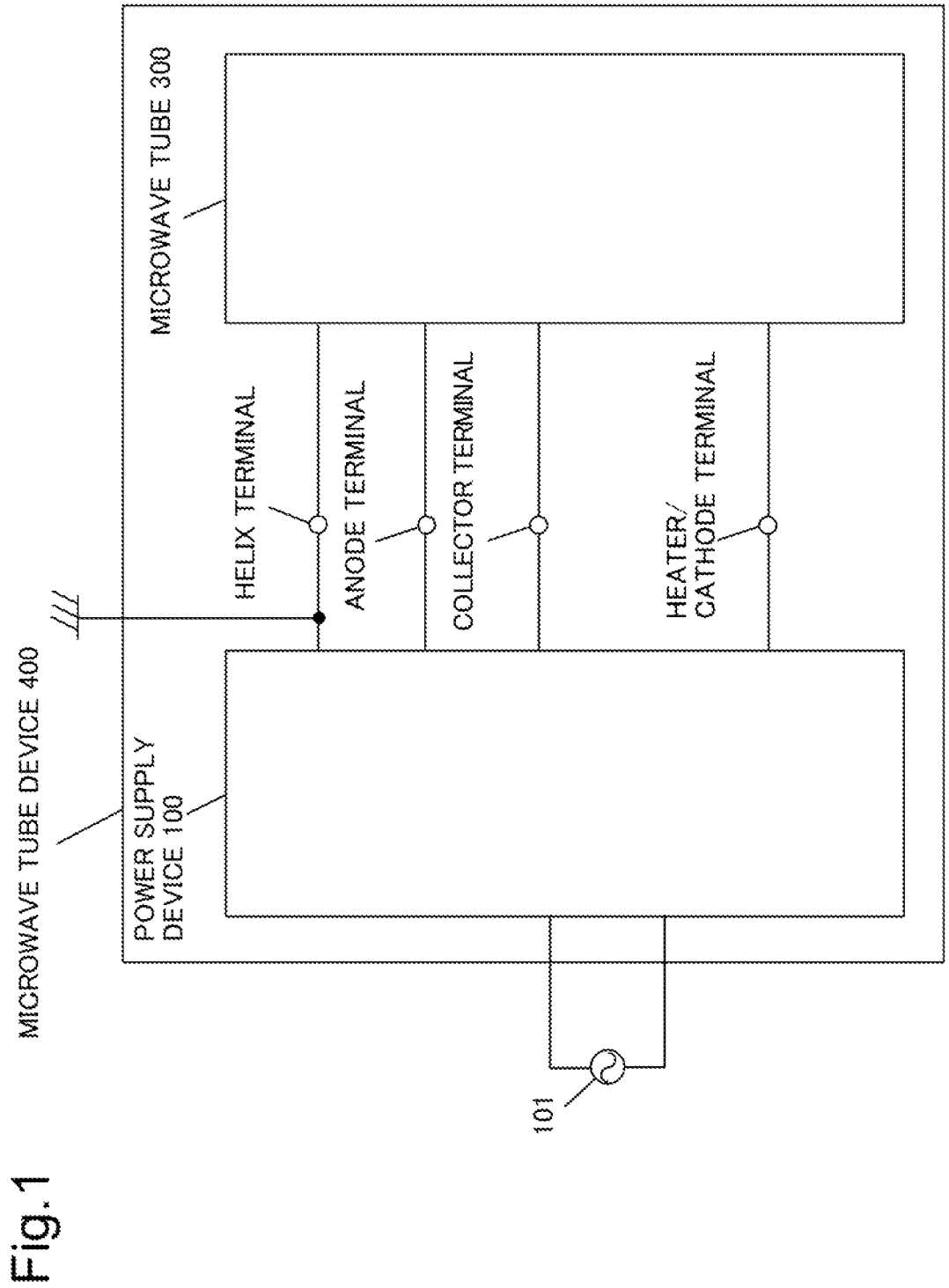
FIG. 1 is a conceptual diagram illustrating a configuration example of a microwave tube device of the present example embodiment.
Figure 2:
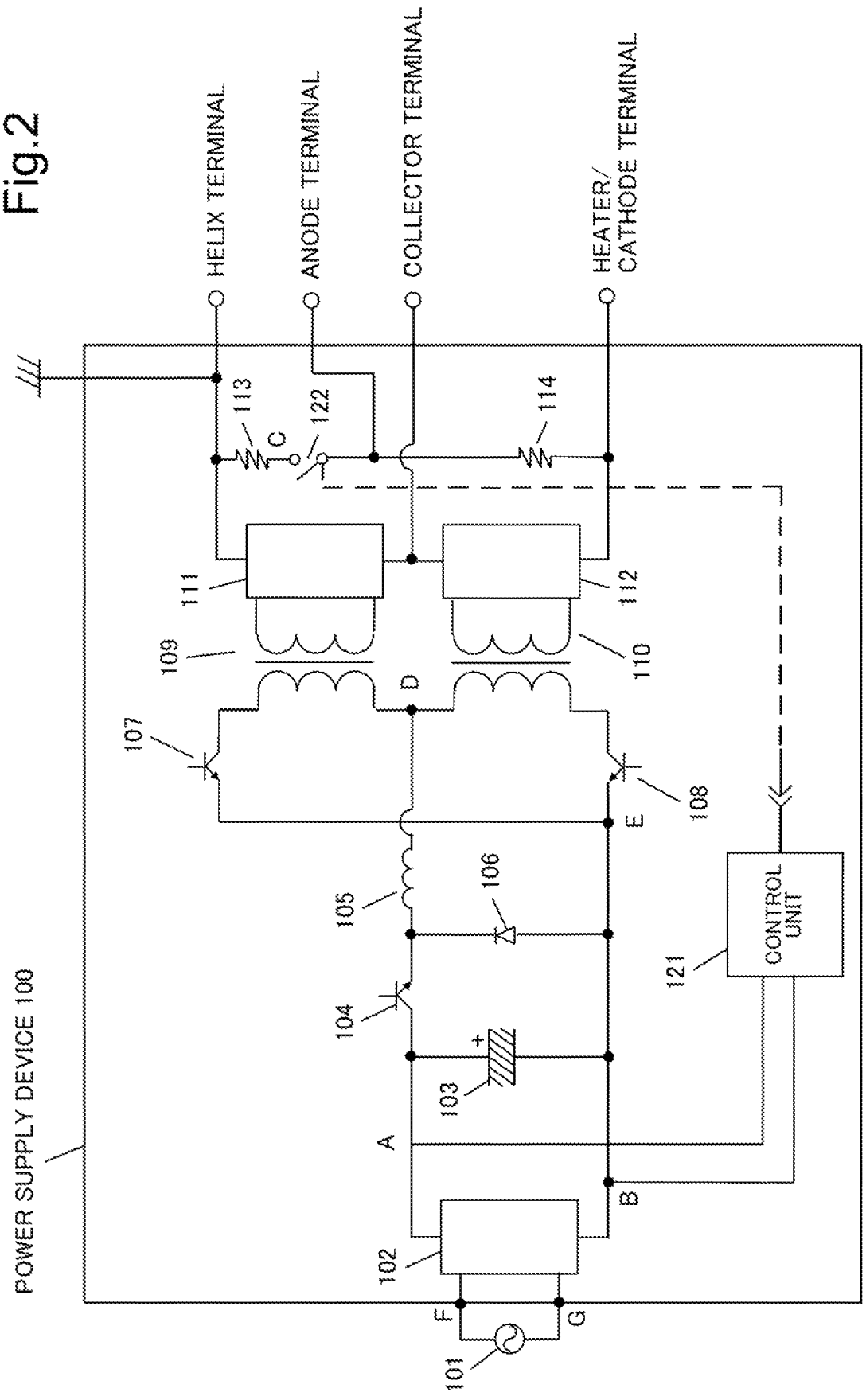
FIG. 2 is a conceptual diagram illustrating a configuration example of a power supply device according to the present example embodiment.

FIG. 1 is a conceptual diagram illustrating a configuration of a microwave tube device 400 which is an example of the microwave tube device of the present example embodiment. FIG. 2 is a conceptual diagram illustrating a configuration example of a power supply device 100 in FIG. 1. The microwave tube device 400 includes a power supply device 100 and a microwave tube 300.

For example, the microwave tube 300 of FIG. 1 includes a collector, a heater, a cathode, an anode, and a helix (not illustrated) like the microwave tube disclosed in PTL1. Here, the heater is a heater for heating the cathode so that electrons are emitted from the cathode included in an electron gun of the microwave tube.

The power supply device 100 is a device for supplying power to the microwave tube 300. The power supply device 100 supplies a predetermined DC voltage to each of a collector terminal, a heater/cathode terminal, an anode terminal, and a helix terminal. These terminals are terminals for supplying a voltage to each of the collector, heater, cathode, anode, and helix of the microwave tube 300. Here, as in the case of PTL1, it is assumed that the heater and a voltage supply terminal to the cathode are common.

As illustrated in FIG. 2, the power supply device 100 includes DC conversion circuits 102, 111, and 112, a rectifying element 106, inverters 104, 107, and 108, a coil 105, transformers 109 and 110, resistors 113 and 114, a power storage unit 103, a control unit 121, and a connection switching unit 122.

The power supply device 100 feeds power to the microwave tube 300 by power supplied from a power source 101. The power source 101 is, for example, a general AC power source of 50 or 60 Hz. An AC voltage input from the power source 101 is converted into a DC voltage by the DC conversion circuit 102, and is supplied to the power storage unit 103 and the subsequent stage (right side). The DC conversion circuit 102 is a general circuit including, for example, a diode and a capacitor. The power storage unit 103 includes a capacitor and a secondary battery, and stores electricity by the DC voltage. The inverter 104, the coil 105, and the rectifying element 106 are inserted to adjust the voltage of the DC voltage.

The DC voltage supplied to the subsequent stage is converted into the AC voltage by the inverters 107 and 108. A frequency of the AC is, for example, about 10 to 100 kHz. Each of the AC voltages is boosted to a predetermined voltage by the transformers 109 and 110, and then converted into a DC by the DC conversion circuits 111 and 112. The DC conversion circuits 111 and 112 are general circuits including, for example, a diode and a capacitor.

A helix terminal connected to the helix of the microwave tube 300 is connected to the ground.

The control unit 121 monitors a voltage $V_{AB}$ between the terminals A and B. When the voltage exceeds a threshold Vth, the control unit 121 transmits a signal for connecting both terminals included in the connection switching unit 122 to the connection switching unit 122. Meanwhile, when the voltage is below the threshold Vth, the control unit 121 transmits a signal for releasing the connection to the connection switching unit 122. For example, the threshold Vth is set to a value in an allowable range even although a power storage amount of the power storage unit 103 starts to become insufficient.

The connection switching unit 122 is, for example, a mechanical switch or a semiconductor switch. The semiconductor switch may include field effect transistors in multiple stages. The connection switching unit 122 performs connection and disconnection of a terminal C to and from the anode terminal in accordance with a signal transmitted from the control unit 121.

As described above, when the voltage $V_{AB}$ is equal to or more than the threshold Vth, the set DC voltage is applied to both the collector terminal and the heater/cathode terminal, and the DC voltage related to the resistors 113 and 114 is supplied to the anode. A resistance value of the resistor 113 may be set to a very small value or zero. Meanwhile, the voltages applied to the collector terminal and the heater/cathode terminal are, for example, −9 kV and 15 kV.

Meanwhile, it is assumed that the voltage $V_{AB}$ is below the threshold Vth. In this case, it is assumed that the connection of the anode terminal to the terminal C is not released. In this case, electric power is consumed by an electron flow from the cathode to the collector, the power storage amount of the power storage unit 103 rapidly decreases, and the supply voltage to the heater/cathode terminal rapidly decreases. Therefore, the temperature of the heater significantly decreases. As described in the section of Technical Problem, once the temperature greatly decreases, it takes time to recover the temperature of the heater to the set temperature. This means that a time required to recover the operation of the microwave tube becomes long.

However, in the power supply device 100, when the voltage $V_{AB}$ starts to be insufficient, the control unit 121 separates the anode terminal from the terminal C by the connection switching unit 122 while the voltage $V_{AB}$ is still at the allowable value. As a result, the electron flow in the microwave tube stops. In this case, a high voltage is applied to a microwave tube body without generating an electron flow, and thus power is hardly consumed. In the microwave tube device as a whole, power is consumed in the heater, a control system, and a cooling system, but these are minor. Therefore, by separating the anode terminal by the connection switching unit 122, power consumption is reduced by about 80 to 90% from the rated power.

Therefore, by separating the anode terminal by the connection switching unit 122, the discharge from the power storage unit 103 and the decrease in the supply voltage from the power storage unit 103 due to the discharge can be greatly suppressed. Therefore, a state in which a desired DC voltage or a DC voltage close to (slightly lower than) the desired DC voltage is supplied to the heater/cathode terminal is maintained for a longer time. In this case, when the voltage $V_{AB}$ recovers to the threshold Vth or more, the time required to recover the operation of the microwave tube can be significantly shortened.

Here, when the power storage amount of the power storage unit 103 is significantly reduced and the supply voltage to the collector terminal and the heater/cathode terminal is significantly reduced, it takes a relatively long time at the millisecond level to restore the supply voltage to these terminals. This is because the voltage supplied to these terminals is as high as −9 kV and 15 kV as described above. When the voltage $V_{AB}$ starts to be insufficient, the control unit 121 stops the supply of large power to the anode while the voltage $V_{AB}$ is still at the allowable value. As a result, the discharge from the power storage unit 103 and the decrease in the supply voltage from the power storage unit 103 due to the discharge can be greatly suppressed. Therefore, a state in which a desired DC voltage or a DC voltage close to (slightly lower than) the desired DC voltage is supplied to the collector terminal and the heater/cathode terminal is maintained for a longer time. In that case, from the viewpoint of supplying a high voltage to these terminals, the time required to restore the operation of the microwave tube can be shortened.

The supply voltage to the anode terminal can be set to a value much smaller than the voltage supplied to the collector terminal and the heater/cathode terminal, and can be set to zero or near zero as described above. In this case, a time required for switching is substantially equal to a switching speed (1 millisecond or less) of the connection switching unit 122.

The instantaneous interruption time of the power source 101, which is one of the causes of the decrease in the voltage $V_{AB}$, is generally 10 to 100 ms. Therefore, when the switching speed of the connection switching unit 122 is equal to or less than 10 ms, it is considered that the effect of stopping the current supply to the anode terminal when the voltage $V_{AB}$ is equal to or less than the threshold Vth can be obtained. Even a mechanical switch can achieve a switching speed of about 10 ms. Therefore, it is considered that the above-described effect of the power supply device of the example embodiment is present to some extent not only in a case where a field-effect transistor is used as the connection switching unit 122 as described above but also in a case where the mechanical switch is used.

The control unit 121 may include a computer. In this case, for example, a program stored in a storage unit of the computer causes a central processing unit of the computer to execute the processing of causing the connection switching unit 122 to switch the connection to the anode terminal and the release thereof.

In the example described above, the voltages to be supplied to the cathode and the heater are common. However, the voltages are not necessarily common, and individual voltages may be supplied from the power supply device to the cathode and the heater.

A voltage monitoring position of the control unit 121 is not limited to between terminals A and B in FIG. 2, and for example, a case where the voltage monitoring position is between terminals D and E or between terminals F and G can also be assumed.

<Advantageous Effects>

In the power supply device according to the present example embodiment, when the supply voltage from the power storage unit to the microwave tube device decreases, the anode terminal is disconnected from the terminal of the power supply system. As a result, the power supplied from the power storage unit to the microwave tube device is greatly reduced, and the decrease in the voltage supplied from the power storage unit to the heater is alleviated. Therefore, the temperature of the heater is maintained at a level required for a longer time or a level close thereto. As described in the section of Technical Problem, when the temperature of the heater is significantly lowered, the heater has a certain heat capacity, and thus it takes time to recover the temperature. Therefore, even when the power supply voltage recovers thereafter, it takes time to recover the temperature of the heater, and thus, it takes time for the microwave tube to operate normally. This issue is solved or alleviated when the temperature of the heater is maintained at or near the level required for a longer period of time. Therefore, the power supply device of the present example embodiment can suppress the time required for the start-up of the microwave tube performed when the supply voltage from the power source decreases without enlarging the scale of the power storage unit.

Figure 3:
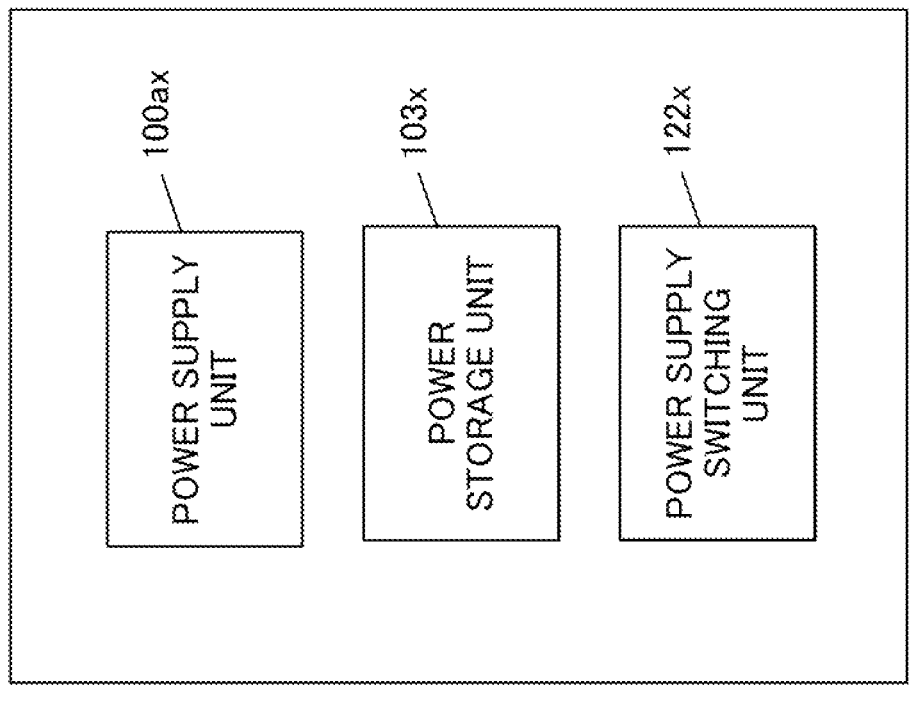
FIG. 3 is a block diagram illustrating a minimum configuration of the power supply device of the example embodiment.

FIG. 3 is a block diagram illustrating a configuration of a power supply device 100x which is a minimum configuration of the power supply device of the example embodiment. The power supply device 100x includes a power supply unit 100ax, a power storage unit 103x, and a power supply switching unit 122x. The power supply unit 100ax feeds supply power from a power source to a microwave tube including a cathode, a heater for heating the cathode, an anode, and a collector. The power storage unit 103x stores the supply power, and supplies stored power that is the stored power to the microwave tube when a voltage of the supply power decreases. The power supply switching unit 122x stops the supply of the stored power to the anode and does not stop the supply of the stored power to the heater when the voltage of the supply power decreases.

The power supply device 100x stops the supply of the stored power to the anode when the voltage of the supply power decreases. As a result, the power supply device 100x greatly suppresses power consumption in the microwave tube device including the microwave tube. Therefore, a decrease rate of the power storage amount of the power storage unit 103x when the voltage of the supply power decreases is suppressed. The power supply device 100x does not stop the supply of the stored power to the heater. Therefore, the heater is not cooled or a cooling speed thereof is suppressed. Therefore, the power supply device 100x can suppress the time required for the start-up of the microwave tube performed when the supply voltage from the power source decreases without enlarging the scale of the power storage unit.

Therefore, the power supply device 100x has the effect described in the section of [Advantageous Effects of Invention] with the above configuration.

Although the example embodiment of the present invention has been described above, the present invention is not limited to the above-described example embodiment, and further modifications, substitutions, and adjustments can be made without departing from the basic technical idea of the present invention. For example, the configurations of the elements illustrated in the drawings are examples for assisting the understanding of the present invention, and are not limited to the configurations illustrated in the drawings.

A portion or the entirety of the above example embodiment may be described as the following Supplementary Notes, but are not limited to the following.

(Supplementary Note 1)

A power supply device including:
  a power supply unit that feeds supply power from a power source to a microwave tube including a cathode, a heater for heating the cathode, an anode, and a collector;
  a power storage unit that stores the supply power and supplies stored power that is the stored power to the microwave tube when a voltage of the supply power decreases; and
  a power supply switching unit that stops the supply of the stored power to the anode and does not stop the supply of the stored power to the heater when the voltage of the supply power decreases.

(Supplementary Note 2)

The power supply device according to Supplementary Note 1, in which
  the power supply switching unit stops the supply of the stored power to the anode when a voltage of the stored power is below a threshold.

(Supplementary Note 3)

The power supply device according to Supplementary Note 2, in which
  the power supply switching unit supplies the stored power to the anode when the voltage of the supply power from the power storage unit exceeds the threshold.

(Supplementary Note 4)

The power supply device according to Supplementary Note 2 or 3, in which
  the power supply switching unit includes
  a connection switching unit that switches between connection to the anode and release of the connection by a control signal, and
  a control unit that transmits the control signal for causing the release to the connection switching unit when the voltage of the supply power from the power storage unit is below the threshold.

(Supplementary Note 5)

The power supply device according to Supplementary Note 4, in which the control unit transmits the control signal for causing the connection to the connection switching unit when the voltage of the supply power from the power storage unit exceeds the threshold.

(Supplementary Note 6)

The power supply device according to any one of Supplementary Notes 1 to 5, in which
an absolute value of a voltage supplied to the anode is significantly smaller than any of an absolute value of a voltage supplied to the collector, an absolute value of a voltage supplied to the cathode, and an absolute value of a voltage supplied to the collector.

(Supplementary Note 7)

The power supply device according to any one of Supplementary Notes 1 to 6, in which
a voltage supplied to the anode is zero or near zero.

(Supplementary Note 8)

The power supply device according to any one of Supplementary Notes 1 to 7,
in which a voltage supplied to the cathode is common to a voltage supplied to the heater.

(Supplementary Note 9)

A microwave tube device including: the power supply device according to any one of Supplementary Notes 1 to 8; and the microwave tube.

(Supplementary Note 10)

A power supply method performed by a power supply device including
a power supply unit that feeds supply power from a power source to a microwave tube including a cathode, a heater for heating the cathode, an anode, and a collector, and
a power storage unit that stores the supply power and supplies stored power that is the stored power to the microwave tube when a voltage of the supply power decreases, the power supply method including
stopping the supply of the stored power to the anode and not stopping the supply of the stored power to the heater when the voltage of the supply power decreases.

(Supplementary Note 11)

A power supply program included in a power supply device including
a power supply unit that feeds supply power from a power source to a microwave tube including a cathode, a heater for heating the cathode, an anode, and a collector, and
a power storage unit that stores the supply power and supplies stored power that is the stored power to the microwave tube when a voltage of the supply power decreases,
the power supply program causing a computer to execute processing of stopping the supply of the stored power to the anode and not stopping the supply of the stored power to the heater when the voltage of the supply power decreases.

Here, the "microwave tube" in the Supplementary Notes is, for example, the microwave tube 300 in FIG. 1. The "power supply unit" is, for example, the anode terminal, the collector terminal, and the heater/cathode terminal in the power supply device 100 of FIG. 2. The "power storage unit" is, for example, the power storage unit 103 in FIG. 2. The "power supply switching unit" is, for example, a combination of the control unit 121 and the connection switching unit 122 in FIG. 2.

The "power supply device" is, for example, the power supply device 100 in FIG. 2. The "connection switching unit" is, for example, the connection switching unit 122 in FIG. 2. The "control unit" is, for example, the control unit 121 in FIG. 2. The "microwave tube device" is, for example, the microwave tube device 400 in FIG. 1.

The "computer" is, for example, the computer included in the control unit 121 in FIG. 2. The "power supply program" is, for example, a program that causes the computer included in the control unit 121 in FIG. 2 to execute processing.

The present invention has been particularly shown and described with reference to the above-described example embodiments as an exemplary example. However, the present invention is not limited to the above-described example embodiment. That is, it will be understood by those of ordinary skill in the art that various aspects may be applied without departing from the spirit and scope of the present invention as defined by the claims.

This application is based upon and claims the benefit of priority from Japanese patent application No. 2020-093062, filed on May 28, 2020, the disclosure of which is incorporated herein in its entirety by reference.

REFERENCE SIGNS LIST

100, 100x power supply device
100ax power supply unit
101 power source
102, 111, 112 DC conversion circuit
103, 103x power storage unit
104, 107, 108 inverter
105 coil
106 rectifying element
109, 110 transformer
113, 114 resistor
121 control unit
122 connection switching unit
122x power supply switching unit
300 microwave tube
400 microwave tube device

What is claimed is:

1. A power supply device comprising:
a power supplier configured to feed supply power from a power source to a microwave tube including a cathode, a heater for heating the cathode, an anode, and a collector;
a power storage configured to store the supply power and supply stored power that is the stored power to the microwave tube when a voltage of the supply power decreases; and
a power supply switcher configured to stop the supply of the stored power to the anode and not stop the supply of the stored power to the heater when the voltage of the supply power decreases.

2. The power supply device according to claim 1, wherein the power supply switcher stops the supply of the stored power to the anode when a voltage of the stored power is below a threshold.

3. The power supply device according to claim 2, wherein the power supply switcher supplies the stored power to the anode when the voltage of the supply power from the power storage means exceeds the threshold.

4. The power supply device according to claim 2, wherein the power supply switcher includes
a connection switcher configured to switch between connection to the anode and release of the connection to the anode by a control signal, and a controller configured to transmit the control signal for causing the release to the connection switcher when the voltage of the supply power from the power storage is below the threshold.

5. The power supply device according to claim 4, wherein the controller transmits the control signal for causing the connection to the connection switcher when the voltage of the supply power from the power storage exceeds the threshold.

6. The power supply device according to claim 1, wherein an absolute value of a voltage supplied to the anode is significantly smaller than any of an absolute value of a voltage supplied to the collector, an absolute value of a voltage supplied to the cathode, and an absolute value of a voltage supplied to the heater.

7. The power supply device according to claim 1, wherein a voltage supplied to the anode is zero or near zero.

8. The power supply device according to claim 1, wherein a voltage supplied to the cathode is common to a voltage supplied to the heater.

9. A microwave tube device comprising:

the power supply device according to claim 1; and the microwave tube.

10. A power supply method performed by a power supply device including a power supplier configured to feed supply power from a power source to a microwave tube including a cathode, a heater for heating the cathode, an anode, and a collector, and a power storage configured to store the supply power and supply stored power that is the stored power to the microwave tube when a voltage of the supply power decreases, the power supply method comprising stopping the supply of the stored power to the anode and not stopping the supply of the stored power to the heater when the voltage of the supply power decreases.

11. A non-transitory computer-readable recording medium included in a power supply device including a power supplier configured to feed supply power from a power source to a microwave tube including a cathode, a heater for heating the cathode, an anode, and a collector, and a power storage configured to store the supply power and supply stored power that is the stored power to the microwave tube when a voltage of the supply power decreases, the recording medium recording a power supply program which causes a computer to execute processing of stopping the supply of the stored power to the anode and not stopping the supply of the stored power to the heater when the voltage of the supply power decreases.

* * * * *